Figure 1:
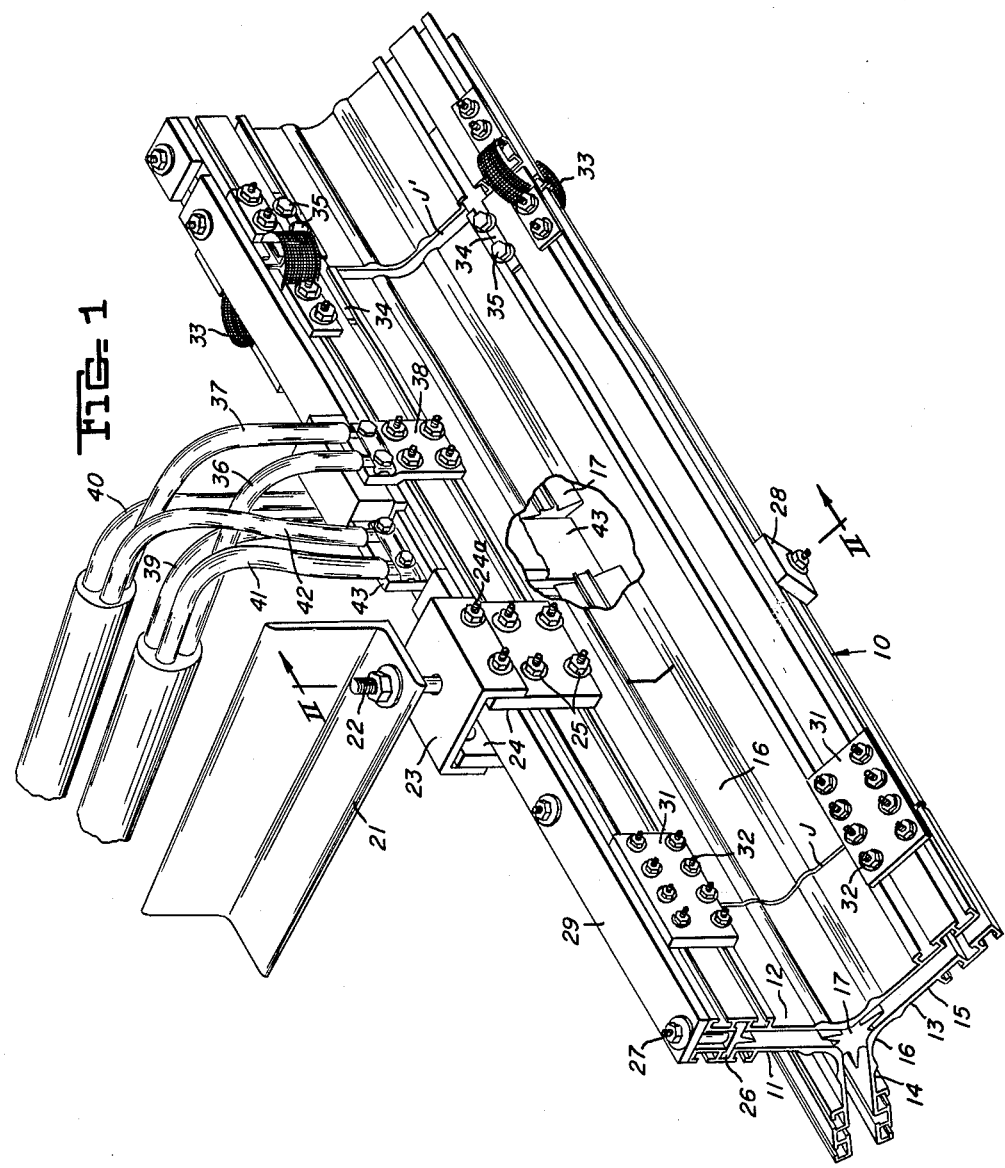

Feb. 12, 1963

H. G. FROSTICK 3,077,512

POWER-SUPPLY CONDUCTOR FOR HEAVY
ALTERNATING-CURRENT LOADS

Filed May 15, 1961

3 Sheets-Sheet 1

INVENTOR
HAROLD G. FROSTICK
By Donald G. Dalton
Attorney

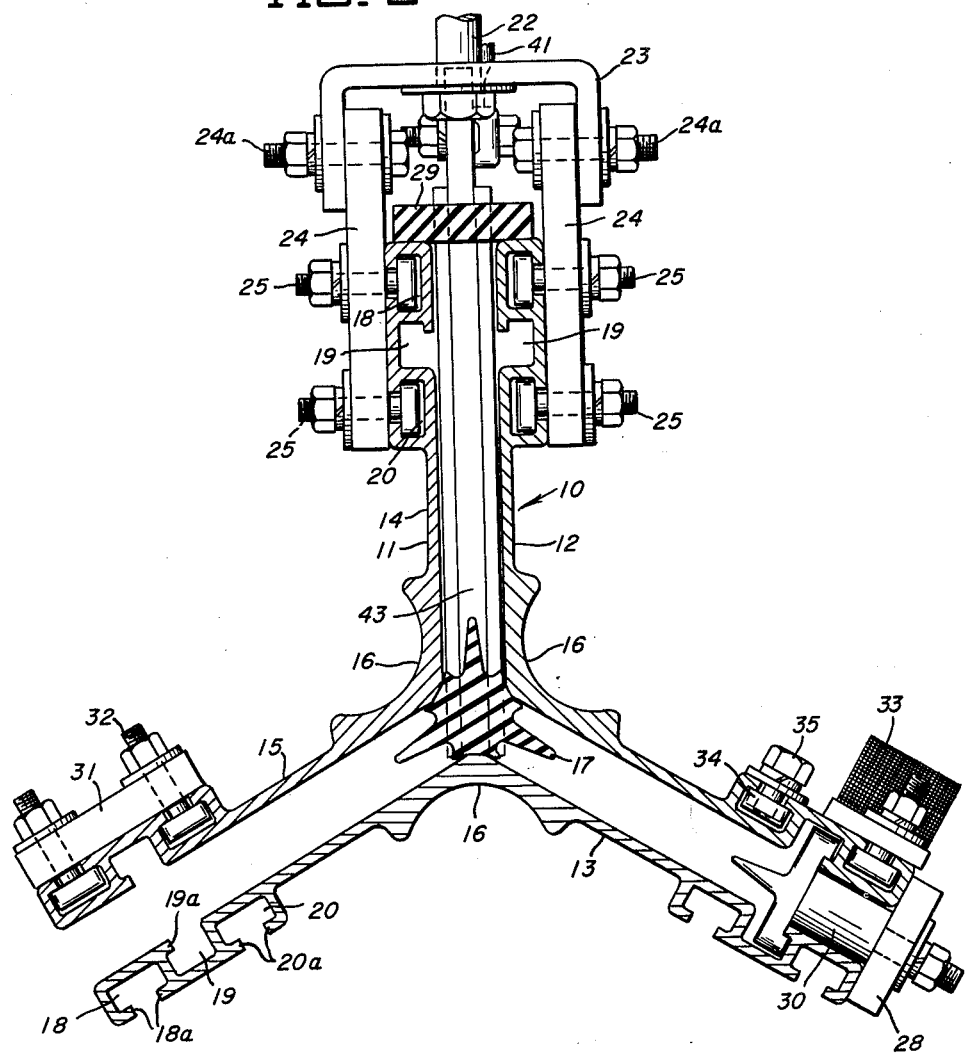

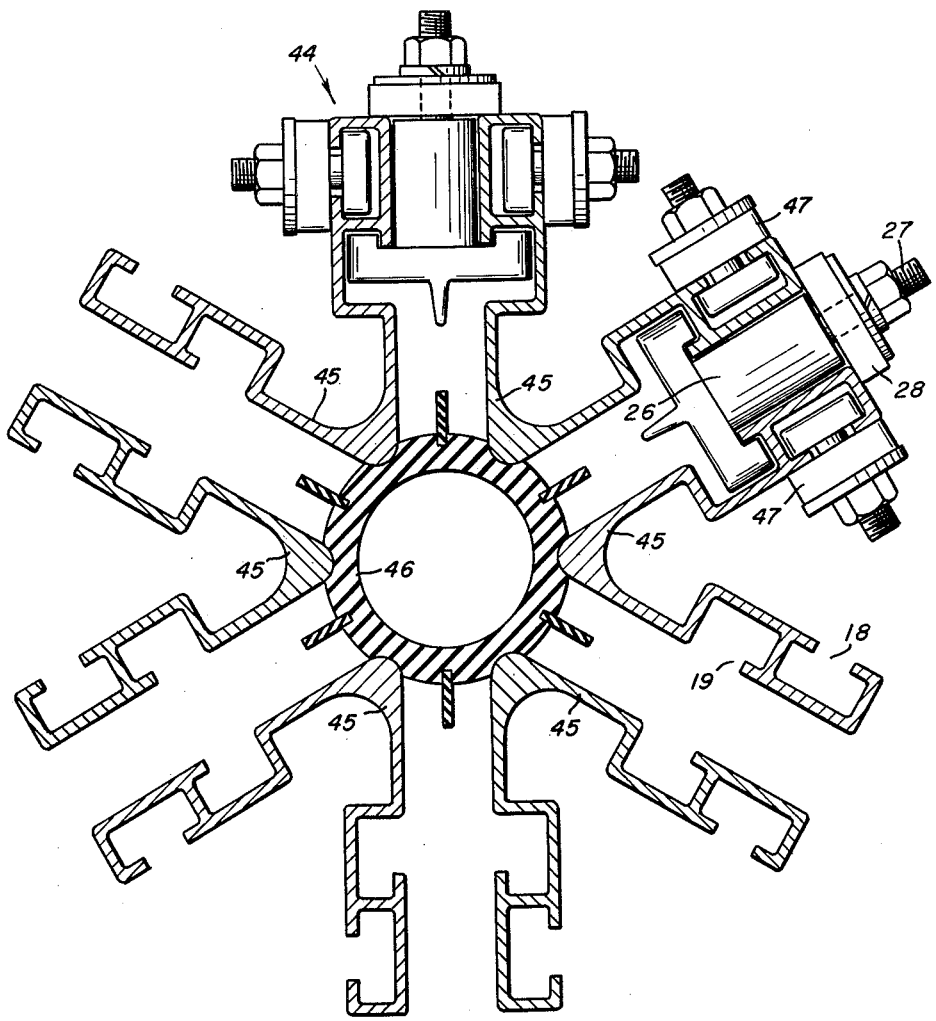

United States Patent Office
3,077,512
Patented Feb. 12, 1963

3,077,512
POWER-SUPPLY CONDUCTOR FOR HEAVY ALTERNATING-CURRENT LOADS
Harold G. Frostick, North Palos Township, Cook County, Ill., assignor to United States Steel Corporation, a corporation of New Jersey
Filed May 15, 1961, Ser. No. 110,170
5 Claims. (Cl. 174—71)

This invention relates to a rigid, polyphase, electrical conductor for supplying heavy alternating-current loads and, more particularly, a conductor suitable for use as a collector rail for vehicles, e.g., traveling cranes.

Conventional collector rails for supplying power to crane motors have a substantial reactance. As a result the impedance drop in the rails is considerable when the load is high. This reduces the voltage applied to the motor and the torque developed thereby which varies as the square of the applied voltage. Booster cables have been connected in parallel with conventional collector rails to reduce the impedance but they are expensive, require separate supports and have other inherent limitations. It is accordingly the object of my invention to provide a rigid polyphase conductor or collector rail of low reactance and high current-carrying capacity.

In a preferred embodiment, my rail comprises three or more elongated conducting bars each having the form of a dihedral angle in section. The several bars are assembled vertex-to-vertex in star or Y relation, separated by a central insulating spacer, and having spacer clamps and suspension fittings engaging the edges of a pair of flanges of adjacent bars.

A complete understanding of the invention may be obtained from the following detailed description and explanation which refer to the accompanying drawings illustrating the present preferred embodiment.

In the drawings:
FIGURE 1 is a perspective view of a short length of conductor according to my invention;
FIGURE 2 is a transverse section therethrough taken along the plane of line II—II of FIGURE 1; and
FIGURE 3 is a view similar to FIGURE 2 showing a modified conductor.

Referring now in detail to the drawings and for the present, to FIGURES 1 and 2 particularly, my rail indicated generally at 10 comprises three similar bars 11, 12 and 13, each having the section of a wide dihedral angle, 120° in the form shown. Each bar includes flanges 14 and 15 and a groove 16 of arcuate contour on the interior of the vertex. As shown, the angle bars are assembled vertex-to-vertex in star or Y relation with an elongated spacer member 17 of insulating material therebetween. The flanges have grooves 18, 19 and 20 adjacent their edges, facing alternately inwardly and outwardly of the interior of the angle bar. The grooves are of rectangular channel section and their side walls have inward extensions 18a, 19a and 20a thereon. Bars 11, 12 and 13 of the sectional shape shown may be extruded through dies from suitable metal such as aluminum.

Rail 10 may be suspended from any convenient supports, such as cantilever brackets 21 by hanger bolts 22. As shown in FIGURE 2, a horizontal yoke 23 carried by each bolt has plates 24 of insulating material secured thereto by bolts 24a. T-head bolts 25 have their heads inserted in grooves 18 and 20 in the flanges of adjacent conductors, with their shanks extending through plates 24. T-head spacer blocks 26 disposed between the flanges at intervals therealong engage slots 19 and are drawn tight thereagainst by nuts turned on studs 27 embedded in the blocks. The nuts bear on a strip 29 of insulating material bridging the gap between the edges of the vertically-disposed flanges. Spacer blocks 26 are dimensioned to be insertible between angle-bar flanges and to enter slots 19 when turned through 90° about their axis. Similar blocks 30 are positioned at intervals between the edges of the inclined flanges. Blocks 30 have end insulators 28 bridging the edges of the flanges at intervals instead of the continuous strip 29.

Joints between lengths of the angle bars at points where provision for expansion and contraction is not necessary, such as shown at J, are bridged by splice plates 31 of conducting metal, lapping the adjacent ends of corresponding flanges and secured thereto by T-head bolts 32 having their heads inserted in grooves 18 and 20. At joints J' where expansion and contraction must be allowed for, flexible jumper straps 33 are secured to the adjacent ends of successive angle-bar lengths by T-head bolts engaging grooves 18. Alignment keys 34 fitting in grooves 20 are secured to the end of one angle bar by screws 35 and are slidable in the end of the adjacent bar.

As is evident, rail 10 is intended to conduct three-phase power. Cables 36 and 37 for one phase of a three-phase supply system are clamped to a tap plate 38 of metal which is bolted to conductor 12 by T-head bolts having their heads in grooves 18 and 20. Cables 39 and 40 are similarly connected to a tap plate bolted to conductor 11. Cables 41 and 42 are clamped to a tap plate 43 extending downwardly between the adjacent flanges of angle bars 11 and 12, separated from both by insulating board, and welded to the vertex of conductor 13. Insulation bar 17 and strip 29 are interrupted to admit plate 43. By this construction, supply taps may be made to a point intermediate the length of the rail 10, without interfering with the passage with the passage of collector shoes sliding in grooves 16.

The rail described above, because of the symmetrical and closely spaced condition of angle bars 11, 12 and 13 has a low reactance and impedance drop. There is also ample section of conductor to afford the conductivity desired. The impedance drop in the rail will not be excessive under full load over a length of 2000 feet or more, and this length may be doubled, of course, if a midpoint tap is used. The rail is also exceptionally well braced against short-circuit forces. It is wholly self-supporting and is quite rigid over ordinary spans. Strip 29 prevents dust from settling on the interior of the rail. A wide clearance for collector shoes is afforded between the flanges of bars 11, 12 and 13.

FIGURE 3 shows a modified conductor 44 in which six angle bars 45 are assembled in star relation about a central core 46 of insulation. Bars 45 are of an acute angle in section and the flanges thereof have grooves 18 and 19 along their edges facing inwardly and outwardly, respectively. The bars are secured together by spacer blocks 26 at intervals therealong and in staggered relation circumferentially of the conductor. End-to-end joints between angle bars are made by conducting splice plates 47. The whole conductor may be disposed within a tubular shell.

It is evident that the structure of FIGURE 3 is better adapted to serve as a supply conductor for a stationary load than as a collector rail although the rail of FIGURES 1 and 2 may be similarly used.

The advantages of my rail are of particularly desirable importance in supplying loads with a power factor less than unity, such as induction motors.

Although I have disclosed herein the preferred embodiment of my invention, I intend to cover as well any change or modification therein which may be made without departing from the spirit and scope of the invention.

I claim:
1. A rigid, polyphase electrical supply conductor comprising a plurality of angle bars, each including flanges and a vertex, assembled vertex-to-vertex in star relation about a central insulating spacer bar, said flanges having grooves extending along their edges, facing alternately inwardly and outwardly of said angles, and T-head spacer blocks of insulating material between the flanges of said conductors extending into certain of said grooves.
2. A conductor as defined in claim 1, characterized by each of said angle bars having a groove of arcuate contour in section interiorly of its vertex.
3. A conductor as defined in claim 1, characterized by supporting means spaced along said conductor including plates of electrical insulation secured to the adjacent flanges of a pair of said angle bars adjacent their edges.
4. A conductor as defined in claim 1, characterized by a tap plate extending between the flanges of adjacent angle bars and insulated therefrom, into conducting engagement with the vertex of another of said angle bars.
5. A conductor as defined in claim 1, characterized by splice plates lapping the ends of adjacent lengths of angle bars and T-head bolts engaging said grooves and extending through said plates.

References Cited in the file of this patent
UNITED STATES PATENTS

| | | |
|---|---|---|
| 2,820,084 | Shaw | Jan. 14, 1958 |
| 2,877,289 | Schymik | Mar. 10, 1959 |
| 2,969,421 | Scott | Jan. 24, 1961 |